Oct. 27, 1959 — E. J. FREOUF — 2,910,198
HAY STACKER
Filed March 29, 1957 — 2 Sheets-Sheet 2

INVENTOR.
Emanuel J. Freouf

United States Patent Office 2,910,198
Patented Oct. 27, 1959

2,910,198

HAY STACKER

Emanuel J. Freouf, Atkinson, Nebr.

Application March 29, 1957, Serial No. 649,413

2 Claims. (Cl. 214—140)

This invention relates to agricultural equipment and more particularly to a device for stacking hay.

It is an object of the present invention to provide a hay stacker device having means for automatically raising and unloading a load of hay from a ground level to a raised level upon a stack.

Another object of the present invention is to provide a hay stacker having a loading head that is maintained in a substantially horizontal position during the elevation thereof and which is automatically rotated to a discharged position upon reaching an uppermost level to discharge the load carried thereupon.

It is another object of the present invention to provide a hay stacker of the above type wherein a loading head is provided with a plurality of retractable stakes for supporting the load of hay in an initial loading and elevating position, which stakes are automatically retracted upon the rotation of the head to the vertical or discharging position, whereby the complete discharge of the load is assured.

Other objects of the invention are to provide a hay stacker bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 3 is a view similar to Figure 2, showing the device in a load raising position.

Figure 1:
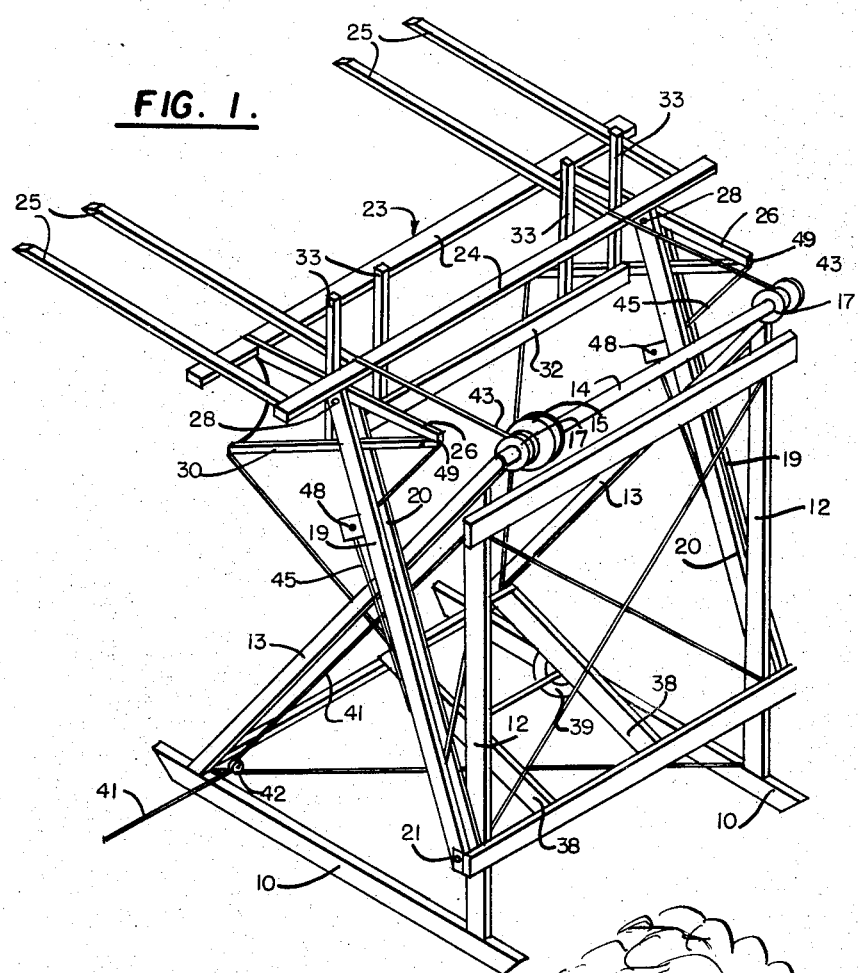
Figure 1 is a perspective view of a hay stacker made in accordance with the present invention.

Referring now more in detail to the drawing, a hay stacker made in accordance with the present invention is shown to include a main support frame provided with a pair of horizontal parallel base arms 10 and a pair of vertical support members 12 secured to the rearmost extremity of the arms 10. A pair of diagonally extending side arms 13 connect the outer end of each of the base arms with the upper end of each of the vertical support members. A transversely extending shaft 14 is rotatably supported upon the upwardly extending arms 13, upon which a sheave 15 is secured intermediate a pair of pulleys 17.

A pair of operating arm assemblies is provided wherein each assembly has a pair of spaced parallel side arms 19, 20, pivoted at one end adjacent to the lower end of the vertical support members 12, such as by a pivot 21. The opposite ends of these arms 19, 20, are rotatably engaged with a pivot pin 28 that is carried at substantially the mid point of each lever arm 26 of a loading head platform 23. A pair of parallel main transversely extending members 24 are secured between these lever arms 26 and support a plurality of forwardly extending tines 25. Thus, the loading head is rotatably supported upon the outer ends of the side arms 19, 20 for movement between a lowered and elevated position.

A forwardly extending bracket 30 is pivotally secured at one end to the inner end 49 of each lever arm 26. These brackets 30 support a transversely extending cross bar 32 upon which a plurality of upwardly extending stakes 33 are secured.

Figures 2, 4:
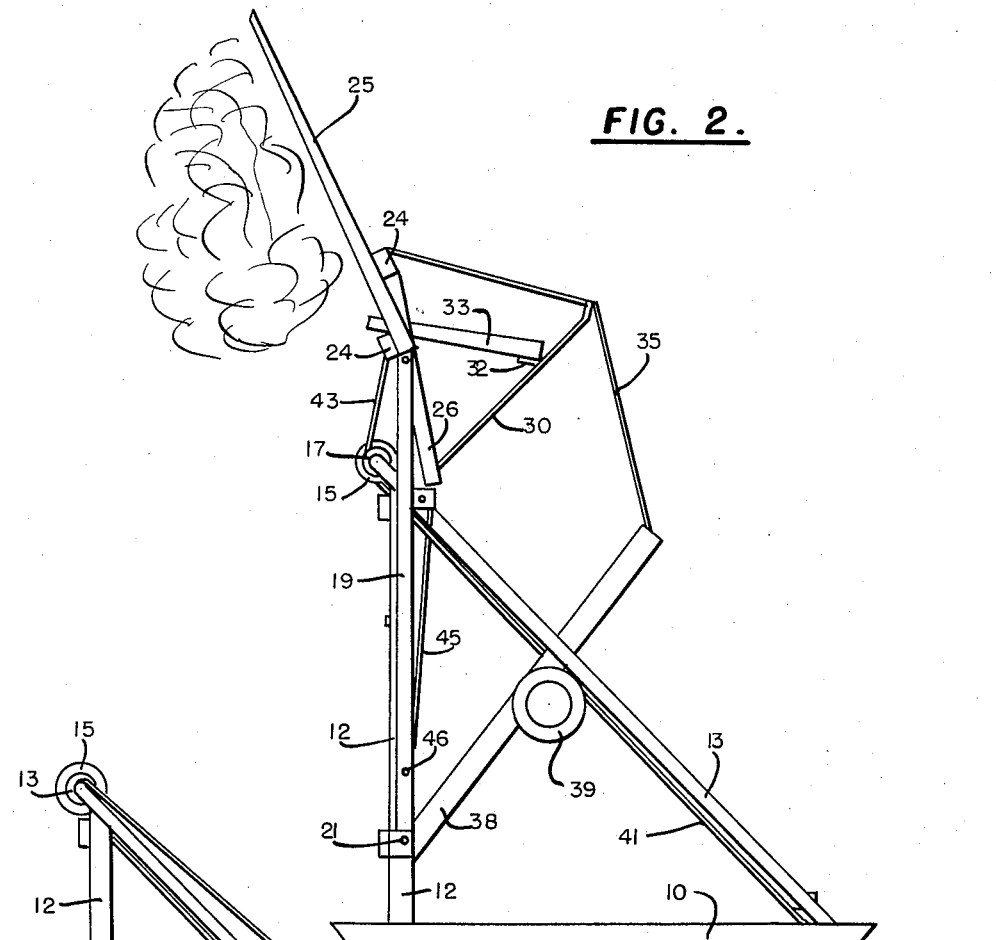
Figure 2 is a side elevational view of the hay stacker shown in Figure 1, in an extreme discharging position.
Figure 4 is a view similar to Figure 2, showing the device in a loading position.

Various cables and pulleys are provided to effect the proper operation of this device. A pair of first operating cables 43 are fixed at one end to the main transverse members 24 of the loading head and at the opposite end extend around the pulleys 17 supported upon the shaft 14. Thus, upon rotation of the shaft 14 by the sheave 15, the loading head 23 is lifted with the side arms 19, 20. A second pair of cables 45 are each secured at one end to the rearwardmost extremity 49 of the loading head lever 26 and are trained about pulleys 48 carried intermediate the longitudinal extremities of the side arms 19, 20, along the intermediate portion of these arms and then upwardly around another pulley 46 adjacent the innermost end of these arms, and into securing engagement with fixed points on the vertical support members 12. This second cable means merely maintains the loading head in a horizontal position during most of the raising operation, but because of the manner in which the cables 45 are trained about the respective pulleys, as the loading head approaches an uppermost position, the effective length of the cable 45 is sufficiently shortened to effect the rotation of the loading head about the pivots 28 to a substantially vertical position as shown in Figure 2.

A single third cable 41 is provided for effecting the rotation of the drive sheave 15 and is trained about a pulley 42 carried adjacent to the outer bottom portion of the base arms 10. This cable is initially wound about the sheave 15 so that a tension thereupon is effective to rotate the sheave 15 and, in turn, rotate the shaft 14 upon which the pulleys 17 are secured and which then are operative to raise the loading head in the aforementioned manner. A fourth cable 35 is secured at one end to the outer end of the lever 26, at an intermediate portion to the end of the bracket 30 and at the opposite end to one extremity of a pivoted frame 38. Thus, as the loading head is raised from its lowermost position in Figure 4, the free ends of the brackets 30 are pivoted away from the free ends of the arms 26, automatically retracting the stakes 33 from an extended position between the tines 25, as is shown in Figures 1 to 3 of the drawing. This frame 38 rotatably supports a pair of wheels 39 that are operative to support the entire device during movement from one location to another. However, during the operation of the hay stacker, the elevation of the load beyond the position shown in Figure 3, causes the cable 35 to raise the free end of the frame 38 about the inner pivoted ends thereof to the position shown in Figure 3. In this position, further upward movement of the wheels 39 are prevented by the abutment of the side arms 13. Thus, a downward pull is exerted upon the cable 35 which limits the rearward movement of the loading head, whereupon the device is not permitted to pass dead center so that the return to the normal loading position shown in Figure 4 may be effected merely by releasing the pull on the third operating cable 41.

While various changes may be made in the detail construction, it shall be understood that such changes shall be within the spirit and scope of the present invention as defined by the appended claims.

What I claim as new and desire to protect by Letters Patent of the United States is:

1. A hay stacker comprising, in combination, a main frame having a horizontal base and a pair of spaced vertically extending supports, a pair of operating arms pivoted at one end to each of said supports, a load carrying head having a plurality of spaced tines pivotally supported upon the opposite end of each of said operating arms, a plurality of stakes displaceably supported between said tines, first cable means for raising said load head in a substantially arcuate direction, second cable means for sequentially maintaining said head in a horizontal position and rotating said head to a vertical position upon reaching an uppermost position, said second cable means automatically retracting said stakes during said rotative and vertical movement of said head, said loading head including a transverse main support member, said tines extending outwardly from said main support member in one direction, a lever bar extending from said main support member in an opposite direction, said main support member of said head being pivotally supported upon said operating arms, said main frame including a pair of diagonally extending arms connecting the outer end of said base to the upper end of said vertically extending supports, said diagonally extending arms being disposed between said pair of operating arms, said first cable means comprising a pair of laterally spaced apart pulleys secured to a shaft rotatably supported upon said vertical supports, a drive sheave fixed to said shaft intermediate said pulleys, a pair of cables each secured at one end to said head and at the opposite end to each of said laterally spaced apart pulleys, and a cable trained about said drive sheave for effecting rotation of said laterally spaced apart pulleys.

2. The combination according to claim 1, further comprising fourth cable means for limiting said rotation of said head, and said second and fourth cable means jointly retracting said stakes during said rotative and vertical movement of said head.

References Cited in the file of this patent
UNITED STATES PATENTS

| | | |
|---|---|---|
| 597,586 | Neff | Jan. 18, 1898 |
| 830,035 | Zimmerman | Sept. 4, 1906 |
| 1,025,320 | Shields et al. | May 7, 1912 |
| 1,322,040 | Messenger | Nov. 18, 1919 |
| 2,692,061 | Freouf | Oct. 19, 1954 |